United States Patent
Kurata (10) Patent No.: US 11,535,327 B2
(45) Date of Patent: Dec. 27, 2022

(54) ACCIDENT DETERMINATION SYSTEM, AND ACCIDENT DETERMINATION METHOD

(71) Applicant: SUZUKI MOTOR CORPORATION, Hamamatsu (JP)

(72) Inventor: Koji Kurata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 342 days.

(21) Appl. No.: 16/831,389

(22) Filed: Mar. 26, 2020

(65) Prior Publication Data

US 2020/0331553 A1    Oct. 22, 2020

(30) Foreign Application Priority Data

Apr. 16, 2019    (JP) .............................. JP2019-077948

(51) Int. Cl.
| | |
|---|---|
| *B62J 45/20* | (2020.01) |
| *G01G 19/44* | (2006.01) |
| *B62J 45/415* | (2020.01) |
| *B62J 27/00* | (2020.01) |

(52) U.S. Cl.
CPC .............. *B62J 45/20* (2020.02); *B62J 27/00* (2013.01); *B62J 45/415* (2020.02); *G01G 19/44* (2013.01)

(58) Field of Classification Search
CPC .......... B62J 45/415; B62J 45/20; B62J 27/00; G01G 19/44
See application file for complete search history.

(56) References Cited

U.S. PATENT DOCUMENTS 10,144,474 B2 * 12/2018 Rajamani ................... B62J 3/10
11,084,376 B2 *  8/2021 Matsuda .............. B62J 45/4151
(Continued)

FOREIGN PATENT DOCUMENTS

| DE | 102 23 366 A1 | 12/2003 |
|---|---|---|
| DE | 10 2009 036 828 B4 | 2/2014 |

(Continued)

OTHER PUBLICATIONS

Indian Office Action dated Mar. 12, 2021, issued by the Intellectual Property of India in corresponding application IN 202014015456.

(Continued)

*Primary Examiner* — Luis A Martinez Borrero
(74) *Attorney, Agent, or Firm* — Stein IP, LLC (57) ABSTRACT

An accident determination system that determines an occurrence of an accident in a straddle-type vehicle, includes a stop detection unit, an end operation unit and a weight detection unit, a control unit. The stop detection unit detects a vehicle stop of the straddle-type vehicle. The end operation unit receives a driving end operation performed by an occupant. The weight detection unit detects a weight value according to a posture of the occupant. The control unit determines whether the vehicle stop is caused by dismounting based on a detection result of the stop detection unit and an operation result of the end operation unit, and determines an occurrence of an accident based on a detection result of the weight detection unit during the vehicle stop caused by a reason other than dismounting.

13 Claims, 8 Drawing Sheets

(56) References Cited

U.S. PATENT DOCUMENTS

| | | | | |
|---|---|---|---|---|
| 2002/0158754 | A1* | 10/2002 | Tabata | B62J 43/30 340/686.1 |
| 2004/0035630 | A1* | 2/2004 | Lich | B60R 21/01516 701/45 |
| 2006/0249936 | A1* | 11/2006 | Miyata | B60R 21/237 280/728.2 |
| 2018/0001952 | A1* | 1/2018 | Rajamani | B62J 45/41 |
| 2020/0171946 | A1* | 6/2020 | Matsuda | B60W 30/045 |
| 2021/0171144 | A1* | 6/2021 | Champoux | B62J 3/14 |
| 2022/0020274 | A1* | 1/2022 | Pfau | G08G 1/166 |
| 2022/0089238 | A1* | 3/2022 | Champoux | B62J 45/20 |

FOREIGN PATENT DOCUMENTS

| | | | | |
|---|---|---|---|---|
| DE | 10 2012 220 355 A1 | 5/2014 | | |
| DE | 10 2013 203 215 A1 | 8/2014 | | |
| DE | 102013203215 A1 * | 8/2014 | | B62J 27/00 |
| DE | 102014202620 A1 * | 8/2015 | | B60W 40/09 |
| DE | 102016205544 A1 * | 3/2017 | | B62J 99/00 |
| DE | 10 2013 224 725 B4 | 6/2019 | | |
| EP | 2881921 A1 | 6/2015 | | |
| JP | 2001-030971 A | 2/2001 | | |
| JP | 2001-328580 A | 11/2001 | | |
| JP | 2009196396 A * | 9/2009 | | B60W 40/09 |
| JP | 2015-110385 A | 6/2015 | | |
| JP | 2015107798 A * | 6/2015 | | B60R 21/00 |
| JP | 2018171973 A * | 11/2018 | | B62J 99/00 |
| WO | WO-0187695 A1 * | 11/2001 | | B62J 27/00 |
| WO | WO-2011018168 A1 * | 2/2011 | | A42B 3/046 |
| WO | WO-2021151721 A1 * | 8/2021 | | B60W 40/09 |
| WO | WO-2021151724 A1 * | 8/2021 | | B62J 99/00 |

OTHER PUBLICATIONS

German Office Action dated May 28, 2021, issued by the German Patent and Trademark Office in corresponding application DE 10 2020 110 445.6.

Japanese Office Action dated Oct. 18, 2022, issued to corresponding Japanese Application No. 2019-077948.

* cited by examiner

ACCIDENT DETERMINATION SYSTEM, AND ACCIDENT DETERMINATION METHOD

CROSS-REFERENCE TO RELATED APPLICATIONS

The disclosure of Japanese Patent Application No. 2019-077948 filed on Apr. 16, 2019, including specification, drawings and claims is incorporated herein by reference in its entirety.

BACKGROUND

The present invention relates to an accident determination system, an accident determination method, and a program.

A system that detects an accident based on an inclination angle of a motorcycle has been proposed (see, for example, Patent Literature 1). A system described in Patent Literature 1 is provided with an inclination sensor that detects an inclination angle of a vehicle, and an accident is detected when an inclination angle which is equal to or larger than a predetermined angle is continuously detected by the inclination sensor for a predetermined time or longer.
[Patent Literature 1] JP-A-2001-328580

SUMMARY

According to one advantageous aspect of the present invention, there is provided an accident determination system according to an aspect of the present invention is an accident determination system that determines an occurrence of an accident in a straddle-type vehicle so as to solve the above problems, which includes: a stop detection unit, which detects a vehicle stop of the straddle-type vehicle; an end operation unit, which receives a driving end operation performed by an occupant; a weight detection unit, which detects a weight value according to a posture of the occupant; and a control unit, which determines whether the vehicle stop is caused by dismounting based on a detection result of the stop detection unit and an operation result of the end operation unit, and determines an occurrence of an accident based on a detection result of the weight detection unit during a vehicle stop caused by a reason other than dismounting.

BRIEF DESCRIPTION OF DRAWINGS

FIGS. 5A-5E are explanatory diagrams of accident determination processing according to the embodiment.

FIGS. 6A-6C are explanatory diagrams of accident level determination processing according to the embodiment, FIG. 6C shows a low level accident.

DETAILED DESCRIPTION OF EXEMPLIFIED EMBODIMENTS

In the system described in the background, when a straddle-type vehicle is overturned, an accident may be detected even though no accident has occurred. For example, in a case where an occupant mishandles a straddle-type vehicle during stopping and the straddle-type vehicle is overturned, that is, when a so-called standing-fall occurs, an accident may be detected.

In view of the above circumstances, an object of the present invention is to provide an accident determination system, an accident determination method, and a program which are capable of appropriately determining an accident when a vehicle is stopped.

An accident determination system according to an aspect of the present invention includes a stop detection unit which detects a vehicle stop of a straddle-type vehicle, and an end operation unit which receives a driving end operation performed by an occupant. Whether the vehicle stop is caused by dismounting of the occupant or the vehicle stop is caused by reasons other than dismounting is determined based on a detection result of the vehicle stop provided by the stop detection unit and an operation result of the end operation provided by the end operation unit. The accident determination system is provided with a weight detection unit that detects a weight value according to a posture of the occupant, and an accident is determined based on the weight value of the occupant. If the weight value of the occupant is a value corresponding to a standing posture, it is determined as occurrence of standing-fall or a temporary stop, and if the weight value of the occupant is a value corresponding to a lying posture or a sitting posture, it is determined as an accident. In this way, the accident can be appropriately determined from the weight value of the occupant during the vehicle stop.

Figure 1:
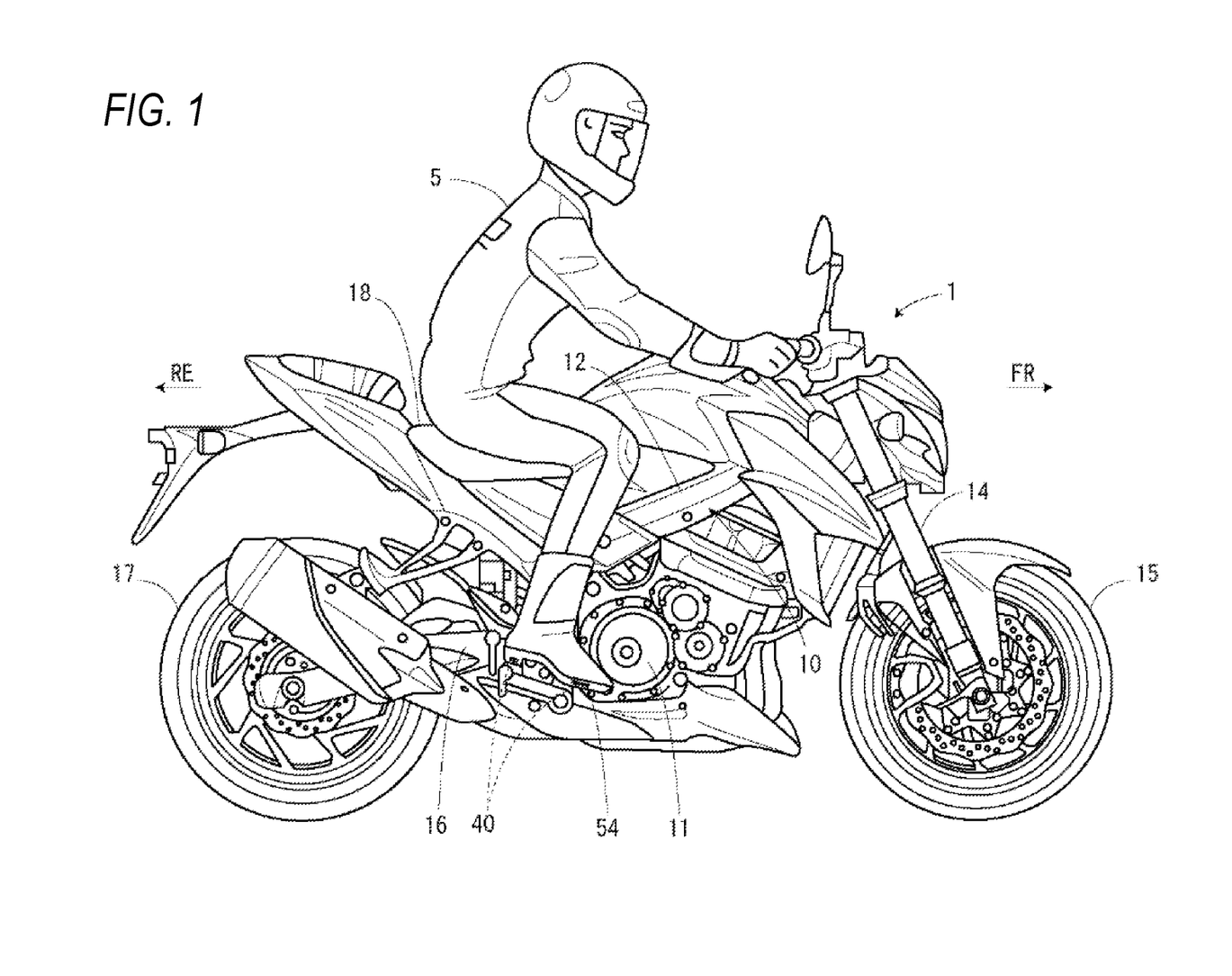
FIG. 1 is a side view of a motorcycle according to an embodiment.

Hereinafter, an embodiment will be described in detail with reference to the accompanying drawings. FIG. 1 is a side view of a motorcycle according to the present embodiment. Here, although an example in which an accident determination system according to the present embodiment is applied to the motorcycle is described, the present invention can also be applied to other straddle-type vehicles, such as a motor tricycle. In the following figures, a front side of a vehicle body is indicated by arrow FR, and a rear side of the vehicle body is indicated by arrow RE.

As shown in FIG. 1, a motorcycle 1 is configured by mounting various components, such as an engine 11 and an electric system, on a twin-spar type vehicle body frame 10 formed by aluminum casting. The vehicle body frame 10 includes a main frame 12 that branches leftward and rightward from a head pipe (not shown) and extends rearward, and a down frame (not shown) that branches leftward and rightward from the head pipe and extends downward. A rear side of the engine 11 is supported by the main frame 12, and a front side of the engine 11 is supported by the down frame. Since the engine 11 is supported on the vehicle body frame 10, rigidity of the entire vehicle body is ensured.

A pair of left and right front forks 14 are supported by the head pipe via a steering shaft (not shown) in a steerable manner, and a front wheel 15 is rotatably supported on a lower portion of the pair of left and right front forks 14. A swing arm 16 is swingably supported on a rear side of the main frame 12, and a rear wheel 17 is rotatably supported on a rear end of the swing arm 16. The engine 11 is connected to the rear wheel 17 via a speed reduction mechanism, and power from the engine 11 is transmitted to the rear wheel 17 via the speed reduction mechanism. A rider seat 18 is provided above the engine 11, and the motorcycle 1 is driven by an occupant 5 who straddles the rider seat 18.

A straddle-type vehicle such as the motorcycle 1 needs to be appropriately handled when an accident occurs. In particular, from the viewpoint of preventive safety measures, reporting is indispensable when an accident occurs. However, severity of injury caused by the accident to the occupant 5 varies, and it is not always necessary to rescue the occupant 5 when the accident occurs. The rescue is not necessary when the occupant 5 is lightly injured, and unnecessary worries or confusion may be caused by the reporting to a report destination, and rescue costs may further create an economic burden on the occupant 5. In addition to overturn caused by accidents, the overturn of the vehicle may also include a case where standing-fall occurs since the vehicle is overturned when the vehicle is stopped, and there is little possibility that rescue is necessary when the standing-fall occurs.

Therefore, it is desirable to determine whether it is necessary to rescue the occupant 5 in consideration of the severity of the injury of the occupant 5. Therefore, the present applicants pay attention to the fact that the occupant 5 is not capable of standing up when a serious accident occurs, and the occupant 5 is capable of standing up when a minor accident or standing-fall occurs, and thus attach a weight sensor 40 to a shoe 54 of the occupant 5. By using the fact that a weight value of the weight sensor 40 changes in accordance with postures of the occupant 5, it is possible to distinguish between an accident or occurrence of standing-fall when the vehicle is stopped and further determine whether a rescue request is necessary for the occupant 5 when an accident occurs.

Figure 2:
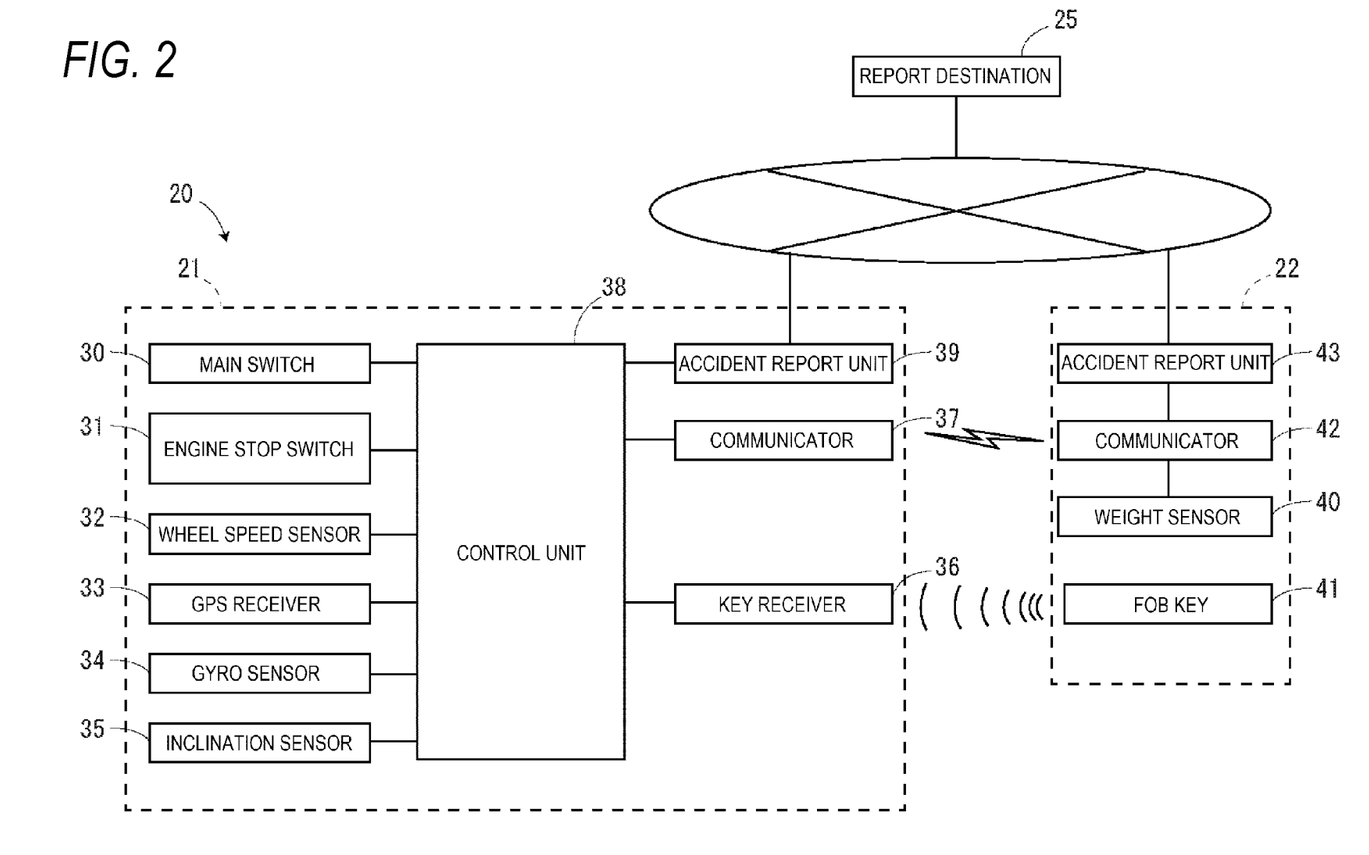
FIG. 2 is a system configuration diagram of an accident determination system according to the embodiment.
Figure 3:
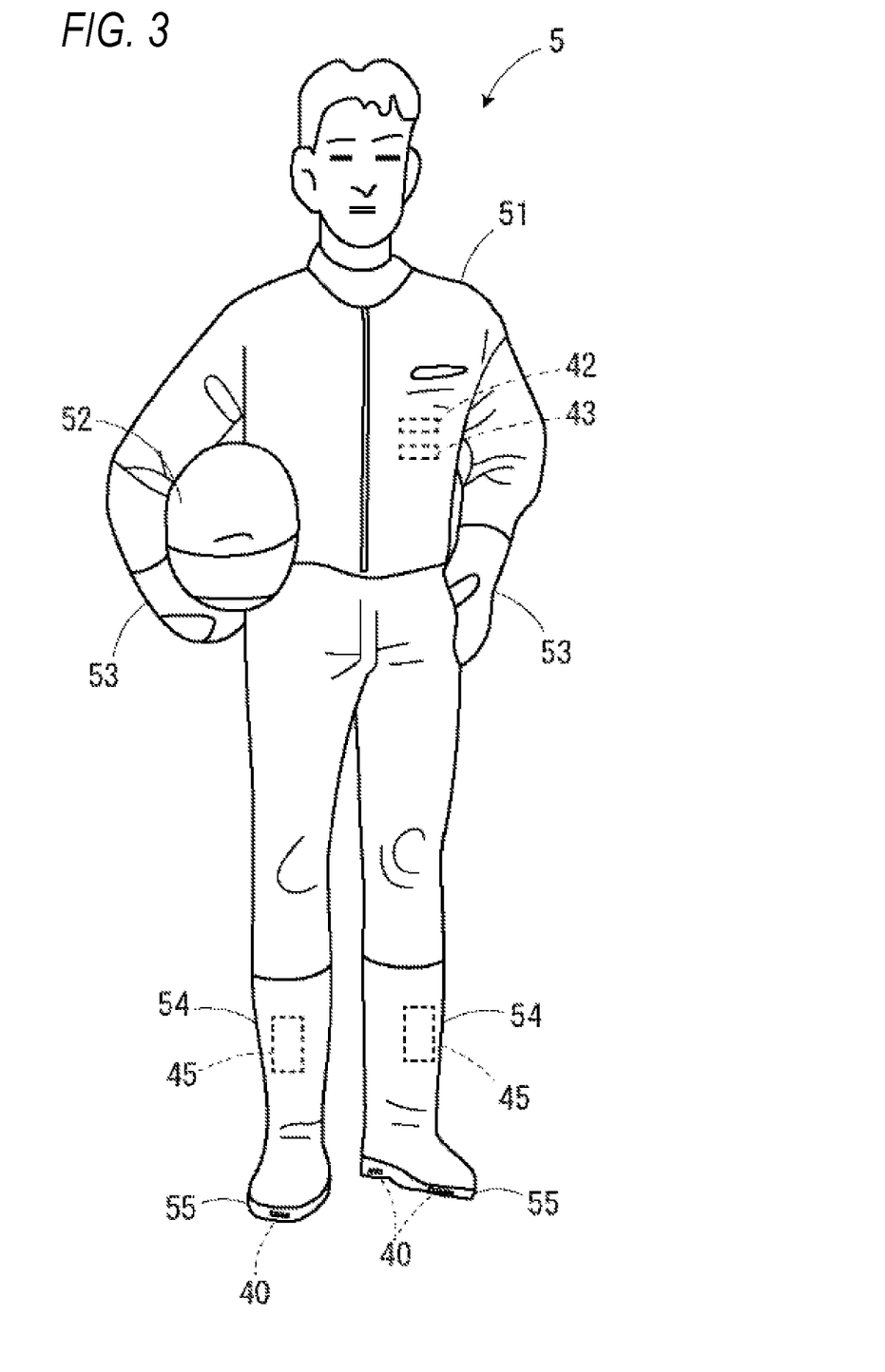
FIG. 3 shows an installation example of an occupant side device according to the embodiment.
Figure 4:
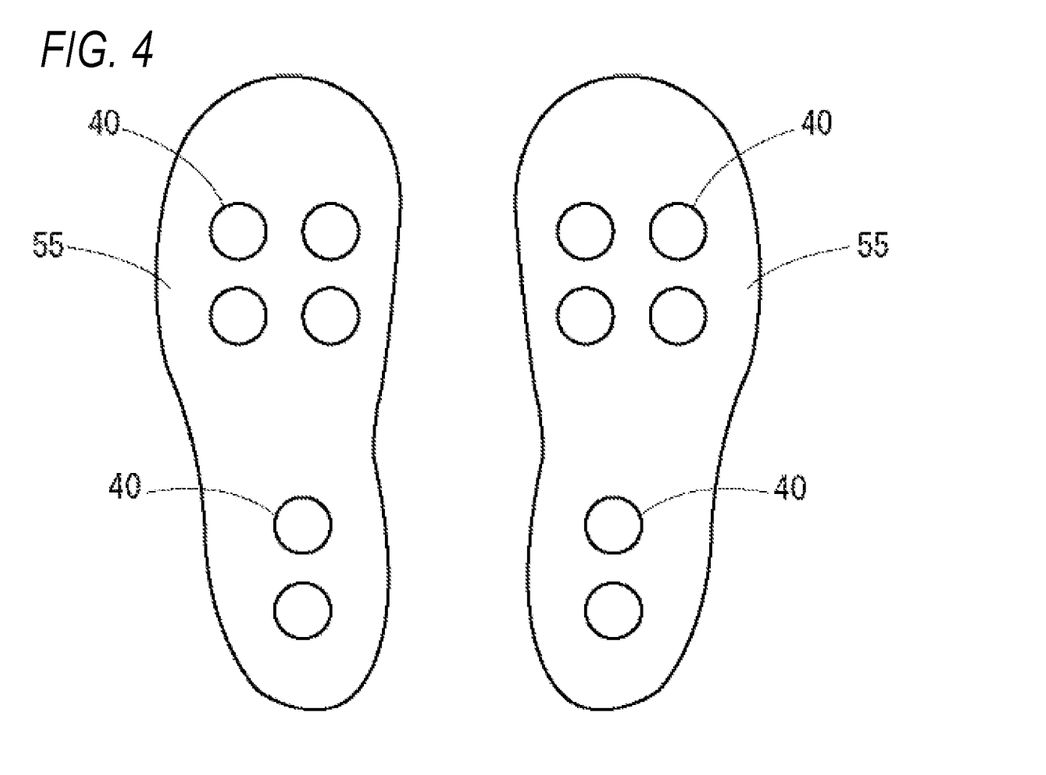
FIG. 4 shows an installation example of a weight sensor according to the embodiment.

A configuration of the accident determination system will be described below with reference to FIGS. 2 to 4. FIG. 2 is a system configuration diagram of the accident determination system according to the embodiment. FIG. 3 shows an installation example of an occupant side device according to the embodiment. FIG. 4 shows an installation example of a weight sensor according to the embodiment. Configurations which are normally provided in a motorcycle are also provided in the embodiment, and descriptions thereof will be omitted. Here, description will be made using reference numerals in FIG. 1 as appropriate.

As shown in FIG. 2, an accident determination system 20 includes in-vehicle devices 21 placed on a motorcycle 1, and occupant side devices 22 attached to the occupant 5. In the accident determination system 20, a main switch 30, an engine stop switch 31, a wheel speed sensor 32, a global positioning system (GPS) receiver 33, a gyro sensor 34, an inclination sensor 35, a key receiver 36, a communicator 37, a control unit 38 and an accident report unit 39 are provided as the in-vehicle devices 21. In the accident determination system 20, a weight sensor 40, a frequency operated button (FOB) key 41, a communicator 42, and an accident report unit 43 are provided as the occupant side devices 22.

The main switch 30 is a power switch of the motorcycle 1, and outputs an ON signal/OFF signal in accordance with an operation of the occupant 5. The engine stop switch 31 is configured to forcibly stop the engine 11 (see FIG. 1), and outputs an engine stop command signal (ON signal) in accordance with an operation of the occupant 5. In the accident determination system 20, the main switch 30 and the engine stop switch 31 function as an end operation unit that receives a driving end operation performed by the occupant 5. That is, the driving end operation is performed by the OFF signal output from the main switch 30 and the command signal output from the engine stop switch 31.

The wheel speed sensor 32 is provided on at least one of a front wheel 15 and a rear wheel 17, and detects rotation speeds of each wheel. The GPS receiver 33 detects position information on a map based on a GPS signal from a satellite. In the accident determination system 20, the wheel speed sensor 32 or the GPS receiver 33 functions as a stop detection unit that detects a vehicle stop of the motorcycle 1. That is, when the rotation speed of the wheel becomes zero, the vehicle stop is detected by the wheel speed sensor 32, and when the position information on the map does not change, the vehicle stop is detected by the GPS receiver 33. GPS map data is stored in, for example, a memory of the control unit 38, which will be described below.

Since there are cases where the GPS signal cannot reach, such as in a tunnel, it is effective to detect the vehicle stop by using the wheel speed sensor 32 and the GPS receiver 33 in combination. Since the gyro sensor 34 is provided in the accident determination system 20, the GPS receiver 33 and the gyro sensor 34 may be combined, and a moving state of the vehicle may be detected in the tunnel by the gyro sensor 34. When an accident involving the motorcycle 1 occurs, the wheel speed sensor 32 on the side of the front wheel 15 may be damaged. For this reason, the vehicle stop may be detected when a wheel speed signal from the wheel speed sensor 32 of the front wheel 15 is interrupted.

The inclination sensor 35 detects a bank angle of the motorcycle 1. The bank angle is used to determine overturn of the vehicle. The key receiver 36 is configured to receive radio waves from the FOB key 41 carried by the occupant 5. In the accident determination system 20, the key receiver 36 and the FOB key 41 function as an occupant detection unit that detects the occupant 5 within a predetermined distance from the motorcycle 1. That is, the predetermined distance is within a communicable range of the FOB key 41, and the occupant 5 is detected within the predetermined distance in which the radio waves from the FOB key 41 reach the key receiver 36. Accordingly, the distance by which the occupant 5 is thrown out from the motorcycle 1 is estimated when the accident occurs.

The communicator 37 includes a transmission circuit and a reception circuit, and is connected to the communicator 42 on the side of the occupant side device 22 by wireless communication. The communicator 37 on the side of the in-vehicle device 21 and the communicator 42 on the side of the occupant side device 22 may be directly connected by short-range wireless communication, or may be connected via a wireless base station by wide-area wireless communication. The control unit 38 determines the accident based on detection results from various sensors of the in-vehicle devices 21 and the occupant side devices 22. The control unit 38 performs accident determination processing in consideration of a vehicle stop caused by reasons other than accident, accident level determination processing in consideration of severity of injury to the occupant 5, and the like.

The control unit 38 may be realized by software using a processor, or may be realized by a logic circuit (hardware) formed in an integrated circuit or the like. When a processor is used, the processor reads and executes a program stored in a memory, thereby performing various processing. For example, a central processing unit (CPU) is used as the processor. The memory is configured by one or a plurality of storage media, such as a read only memory (ROM) or a random access memory (RAM), depending on an application thereof. Parameters used for the various processing are stored in the memory.

The accident report unit 39 automatically reports an accident of a medium or higher level, which cannot be reported by the occupant, to a report destination 25. When a low level accident occurs, the report destination 25 is not automatically reported that the occupant 5 is lightly injured. However, the motorcycle 1 is preferably provided with an operation unit that can perform reporting by a simple operation, such as one push. Reported information includes an occurrence location of the accident, the severity of the injury to the occupant 5, and the like. For example, a call center, an insurance company, a security company, a home, or an emergency center can be set as the report destination 25 freely. In this case, report destination information is registered in advance in the memory of the control unit 38.

The key receiver 36, the communicator 37, the control unit 38, and the accident report unit 39 are preferably provided in a periphery of the main frame 12 where impact resistance is ensured. For example, the communicator 37, the control unit 38, and the accident report unit 39 are provided in the vicinity of a connection portion between the head pipe and the main frame 12 or inside the main frame 12. Power is supplied to each in-vehicle device 21 from a battery (not shown) of the motorcycle 1. The power may be supplied to each in-vehicle device 21 from an existing battery of the motorcycle 1, or the power may be supplied to each in-vehicle device 21 from a dedicated battery for the accident determination system 20.

The weight sensor 40 is a load sensor provided on a shoe sole 55 (see FIG. 3) of the occupant 5, and detects a weight value according to a posture of the occupant 5. The weight sensor 40 is configured, for example, by placing a plurality of button type pressure sensors on the shoe sole. When a weight value of the weight sensor 40 is large, it is estimated that the occupant 5 is in a standing posture, when the weight value of the weight sensor 40 is small, it is estimated that the occupant 5 is in a sitting posture, and when the weight value of the weight sensor 40 is substantially zero, it is estimated that the occupant 5 is in a lying posture. Power is supplied to the weight sensor 40 from a battery 45 (see FIG. 3) provided in a shoe 54 (see FIG. 3) of the occupant 5.

The FOB key 41 is a portable electronic key of a smart entry system, and functions as the occupant detection unit as described above. The communicator 42 includes a transmission circuit and a reception circuit, and is connected to the communicator 37 on the side of the in-vehicle device 21 by short-range wireless communication or wide-area wireless communication. When an accident of a medium or higher level is detected in the control unit 38 on the side of the in-vehicle device 21, the accident report unit 43 automatically reports the accident to the report destination 25. Since the accident report units 39, 43 are provided both on the side of the in-vehicle device 21 and the side of the occupant side device 22, even if one of the accident report units 39, 43 is damaged, the other one can still report the accident. The FOB key 41, the communicator 42, and the accident report unit 43 each include a built-in battery (not shown).

Although the communicator 42 and the accident report unit 43 are provided in clothing 51 of the occupant 5 as shown in FIG. 3, the communicator 42 and the accident report unit 43 may also be provided in a helmet 52 of the occupant 5. The communicator 42 and the accident report unit 43 may also be provided in a waist bag (not shown) attached to a waist of the occupant 5, gloves 53 of the occupant 5, or an accessory, such as a watch (not shown). That is, the communicator 42 and the accident report unit 43 may also be provided on a wearing article of the occupant 5. Further, the communicator 42 and the accident report unit 43 may be realized by a portable communication terminal, such as a smartphone carried by the occupant 5.

The weight sensor 40 is provided on the shoe sole 55 of the occupant 5, and the battery 45 of the weight sensor 40 is provided in a cylindrical portion of the shoe 54. When a weight of the occupant 5 is detected by the weight sensor 40, a weight value of the occupant 5 is output to the control unit 38 of the motorcycle 1 via the communicator 42, and the weight value is used for various determination processing in the control unit 38. The weight sensor 40 is disposed at a position where the weight value of the occupant 5 can be detected, for example, in a shoe sole sheet or an inner sock sheet in the shoe. As shown in FIG. 4, the weight sensor 40 is a plurality of button type pressure sensors, and is provided on the shoe sole 55 at a position avoiding an arch where the weight of the occupant 5 is difficult to be transmitted.

The communicator 42 and the accident report unit 43 may also be provided in the shoe 54 in the same manner as the weight sensor 40. In this case, power may be supplied from the battery 45 of the weight sensor 40 to the communicator 42 and the accident report unit 43. Although the control unit 38 is provided in the motorcycle 1 in the present embodiment, the control unit may also be provided in the wearing article of the occupant 5, or the control unit may be provided in a portable communication terminal, such as a smartphone. Accordingly, the control unit, the communicator 42, and the accident report unit 43 may all be realized by the smartphone. A deformable type, such as a foldable type smartphone has also been developed, such that the smartphone may be provided in the shoe 54 instead of the smartphone provided in the clothing 51 of the occupant 5. Since the control unit is carried by the occupant 5, the control unit can also be shared between a plurality of the motorcycles 1.

Figure 5A:
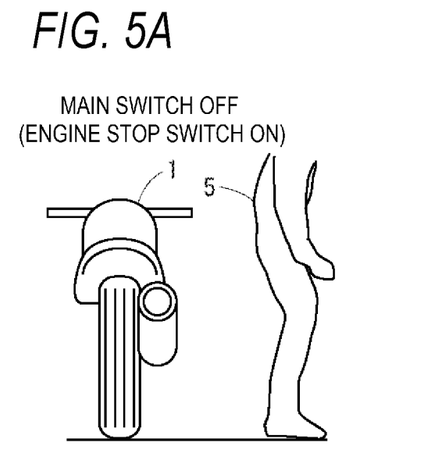
FIG. 5A shows a dismounting state.
Figure 5B:
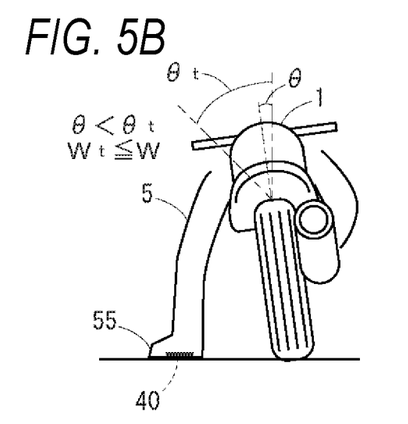
FIG. 5B shows a temporary stop state.
Figure 5C:
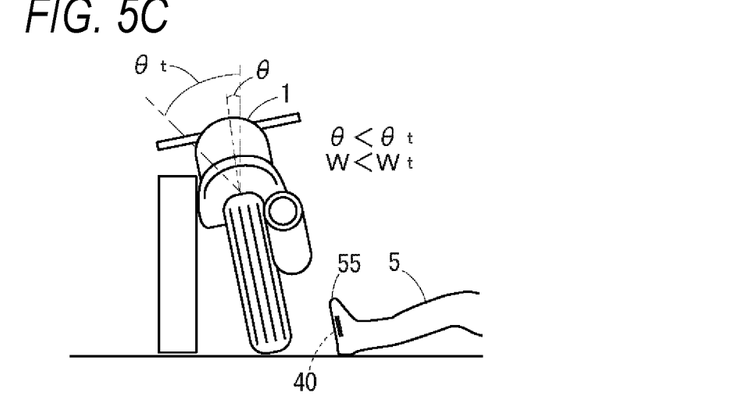
FIG. 5C shows an accident state.
Figure 5D:
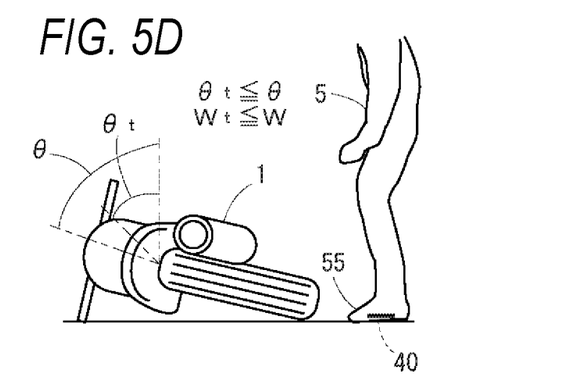
FIG. 5D shows a standing-fall state.
Figure 5E:
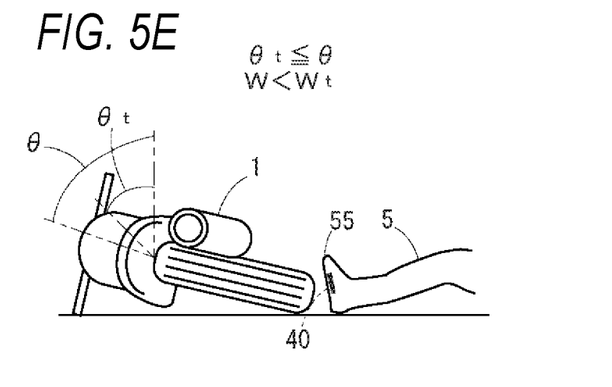
FIG. 5E shows another accident state.
Figure 6A:
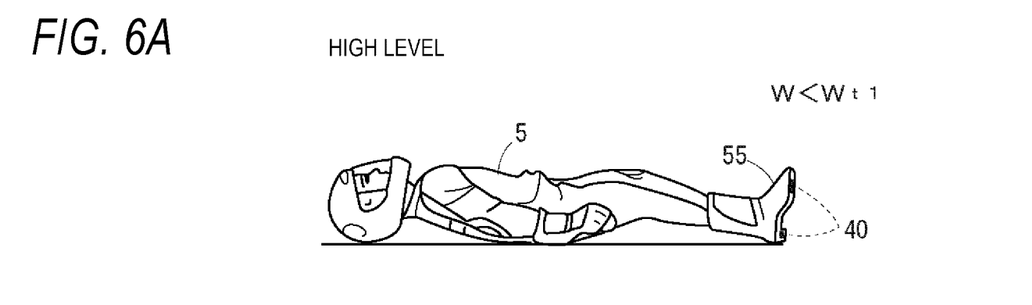
FIG. 6A shows a high level accident.
Figure 6B:
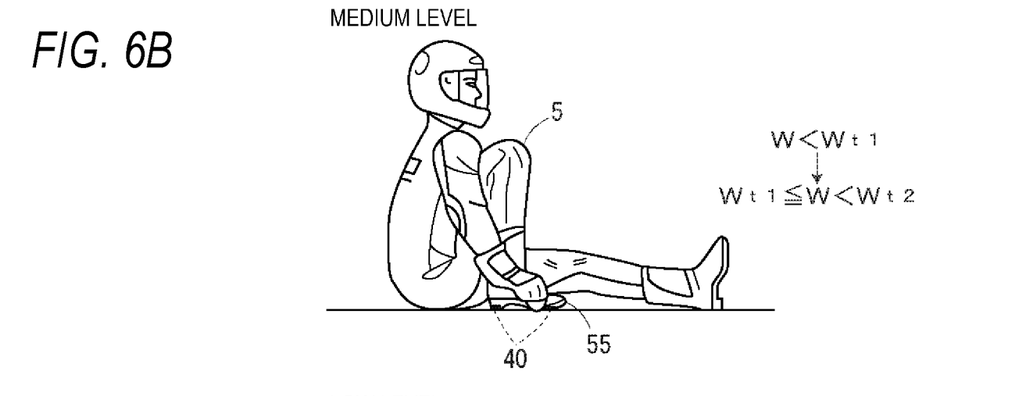
FIG. 6B shows a medium level accident.
Figure 6C:
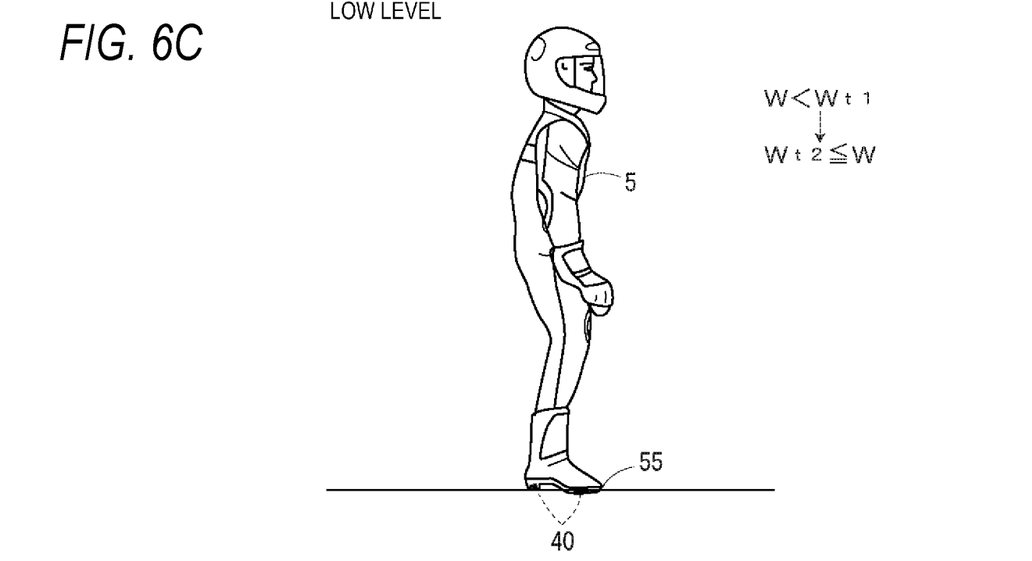
Figure 7:
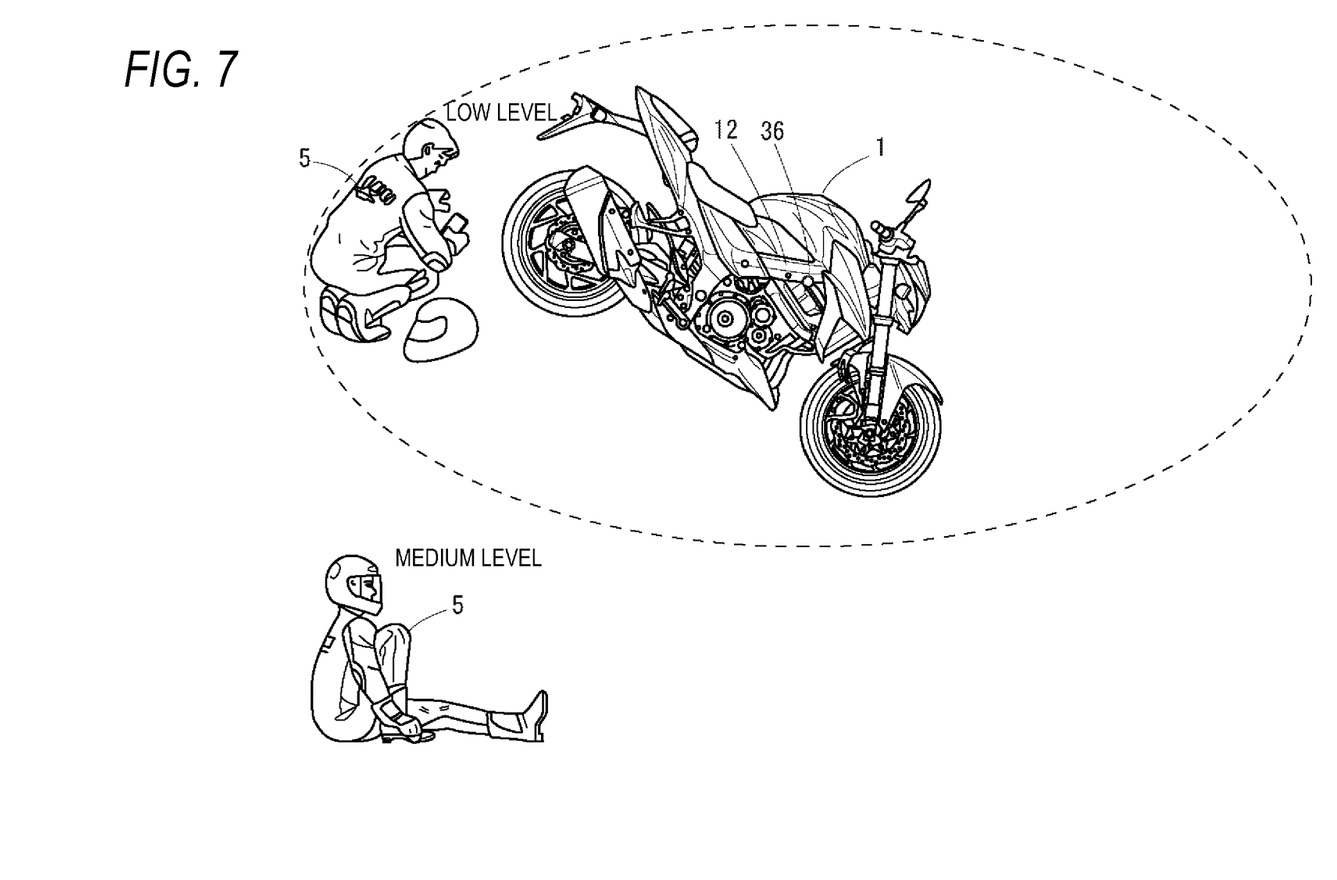
FIG. 7 is a perspective view showing another example of the accident level determination processing according to the embodiment.

The determination processing performed by the control unit will be described with reference to FIGS. 5A to 7. FIGS. 5A-5E are explanatory diagrams of accident determination processing according to the embodiment, FIG. 5A shows a dismounting state, FIG. 5B shows a temporary stop state, FIG. 5C shows an accident state, FIG. 5D shows a standing-fall state, and FIG. 5E shows another accident state. FIGS. 6A-6C are explanatory diagrams of accident level determination processing according to the embodiment, FIG. 6A shows a high level accident, FIG. 6B shows a medium level accident, and FIG. 6C shows a low level accident. FIG. 7 is a perspective view showing another example of the accident level determination processing according to the embodiment. Here, description will be made using reference numerals in FIGS. 2 and 3 as appropriate.

As shown in FIG. 5A, when the vehicle is stopped due to dismounting, the main switch 30 or the engine stop switch 31 is operated by the occupant 5. For this reason, when the OFF signal is input from the main switch 30 to the control unit 38 or when the engine stop command signal is input from the engine stop switch 31 to the control unit 38, the control unit 38 determines that the vehicle is stopped due to dismounting of the occupant 5. When the OFF signal is not input from the main switch 30 to the control unit 38 while the command signal is not input from the engine stop switch 31 to the control unit 38, the control unit 38 determines that the vehicle is stopped due to reasons other than dismounting of the occupant 5.

As shown in FIG. 5B, when the vehicle is stopped due to a temporary stop, the motorcycle 1 is supported by a foot of the occupant 5 in a state in which the motorcycle 1 is inclined. That is, a bank angle θ of the motorcycle 1 is less than a maximum bank angle $θ_t$ (for example, 45°), and the weight of the occupant 5 is sufficiently applied to the weight sensor 40 on the shoe sole 55. For this reason, when the bank angle θ which is less than the maximum bank angle $θ_t$ is input from the inclination sensor 35 to the control unit 38 while a weight value W which is equal to or larger than a predetermined weight value $W_t$ is input from the weight sensor 40 to the control unit 38 when the vehicle is stopped, the control unit 38 determines that the vehicle is stopped due to a temporary stop during driving.

As shown in FIG. 5C, an accident may occur even if the vehicle is not overturned. For example, the motorcycle 1 is supported by a guardrail or the like, and the occupant 5 is thrown out from the motorcycle 1 without overturning the motorcycle 1. The bank angle θ of the motorcycle 1 is less than the maximum bank angle $θ_t$, and the weight of the occupant 5 hardly acts on the weight sensor 40 on the shoe sole 55. For this reason, when the bank angle θ which is less than the maximum bank angle $θ_t$ is input from the inclination sensor 35 to the control unit 38 while the weight value W which is less than the predetermined weight value $W_t$ is input from the weight sensor 40 to the control unit 38 when the vehicle is stopped, the control unit 38 determines that an accident has occurred.

As shown in FIG. 5D, there may be no accident even if the vehicle is overturned, such as when a standing-fall occurs. When standing-fall occurs, the occupant 5 stands up and the motorcycle 1 is overturned. The bank angle θ of the motorcycle 1 is equal to or larger than the maximum bank angle $θ_t$, and the weight of the occupant 5 sufficiently acts on the weight sensor 40 on the shoe sole 55. For this reason, when the bank angle θ which is equal to or larger than the maximum bank angle $θ_t$ is input from the inclination sensor 35 to the control unit 38 while the weight value W which is equal to or larger than the predetermined weight value $W_t$ is input from the weight sensor 40 to the control unit 38 when the vehicle is stopped, the control unit 38 determines that standing-fall has occurred.

As shown in FIG. 5E, when the vehicle is overturned as an accident occurs, the bank angle θ of the motorcycle 1 is equal to or more than the maximum bank angle $θ_t$, and the weight of the occupant 5 hardly acts on the weight sensor 40 on the shoe sole 55. For this reason, when the bank angle θ which is equal to or more than the maximum bank angle $θ_t$ is input from the inclination sensor 35 to the control unit 38 while the weight value W which is less than the predetermined weight value $W_t$ is input from the weight sensor 40 to the control unit 38 when the vehicle is stopped, it is determined that an accident has occurred. A value, which can distinguish between the weight value W acting on the weight sensor 40 when the accident occurs and the weight value W acting on the weight sensor 40 when the temporary stop and the standing-fall occur, is set as the predetermined weight value $W_t$.

When the accident is determined by the control unit 38, an accident level thereof is further determined by the control unit 38. Since the occupant 5 is thrown out from the motorcycle 1 when the accident occurs, the weight value W acting on the weight sensor 40 on the shoe sole 55 temporarily becomes a value that is close to zero. Normally, when an accident occurs, the occupant 5 attempts to stand up from a fallen state so as to deal with the accident. In a case where the occupant 5 is lightly injured, the occupant 5 can stand up, and in cases where the occupant 5 is seriously injured or intermediately injured, the occupant 5 cannot stand up from the fallen state. Since the weight value W acting on the weight sensor 40 on the shoe sole 55 is different depending on a posture of the occupant 5 at this time, the control unit 38 uses variation of the weight value W to determine the accident level.

In this case, in addition to the maximum bank angle $θ_t$ and the predetermined weight $W_t$, the memory of the control unit 38 stores a first weight value $W_{t1}$ for distinguishing between a lying posture and a sitting posture, and a second weight value $W_{t2}$ for distinguishing between the sitting posture and a standing posture. The weight of the occupant 5 hardly acts on the weight sensor 40 on the shoe sole 55 in the lying posture, a part of the weight of the occupant 5 acts on the weight sensor 40 on the shoe sole 55 in the sitting posture, while the entire weight of the occupant 5 acts on the weight sensor 40 on the shoe sole 55 in the standing posture. Therefore, the weight value W which is less than the first weight value $W_{t1}$ indicates the lying posture, the weight value W which is equal to or larger than the first weight value $W_{t1}$ and less than the second weight value $W_{t2}$ indicates the sitting posture, and the weight value W which is equal to or larger than the second weight value $W_{t2}$ indicates the standing posture.

FIG. 6A shows a state in which the occupant 5 falls to the ground and cannot stand up from the lying posture. In this state, a state in which the weight of the occupant 5 hardly acts on the weight sensor 40 on the shoe sole 55 is continued. Therefore, time which has elapsed after the occupant 5 falls down, that is, time which has elapsed since the weight value W, which is less than the first weight value $W_{t1}$, is detected by the weight sensor 40 is measured by a timer in the control unit 38. When a predetermined or longer time has elapsed in the state where the weight value W is less than the first weight value $W_{t1}$, the control unit 38 determines that the accident level is a high level. In this case, the accident is automatically reported to the report destination 25 by the accident report units 39, 43, since injury to the occupant 5 is heavy and the occupant 5 cannot rise from the lying posture.

FIG. 6B shows a state in which the occupant 5 falls to the ground and is in the sitting posture (with one knee drawn up). In this state, the state changes from the state where the weight of the occupant 5 hardly acts on the weight sensor 40 on the shoe sole 55 to a state where a part of the weight of the occupant 5 acts on the weight sensor 40. Therefore, time which has elapsed after the occupant 5 falls down is measured by the timer, and the control unit 38 determines that the accident level is a medium level when the weight value W increases from a value that is less than the first weight value $W_{t1}$ to a value that is equal to or more than the first weight value $W_{t1}$ and less than the second weight value $W_{t2}$ within the predetermined time. In this case, the accident is automatically reported to the report destination 25 by the accident report units 39, 43, since injury to the occupant 5 is medium, although the occupant 5 can rise from the lying posture, the occupant 5 cannot stand up.

FIG. 6C shows a state in which the occupant 5 falls to the ground and then stands up. In this state, the state changes from the state where the weight of the occupant 5 hardly acts on the weight sensor 40 on the shoe sole 55 to a state where the entire weight of the occupant 5 acts on the weight sensor 40. Therefore, time which has elapsed after the occupant 5 falls down is measured by the timer, and the control unit 38 determines that the accident level is a low level when the weight value W increases from a value that is less than the first weight value $W_{t1}$ to a value that is more than the second weight value $W_{t2}$ within the predetermined time. In this case, the accident is not automatically reported, since injury to the occupant 5 is light or the occupant 5 is intact, the occupant 5 can stand up from the lying posture and handle the accident, such as reporting the accident, at own discretion.

Even in a case where the occupant 5 cannot immediately stands upright, the occupant 5 may be able to handle the accident, such as reporting the accident, at own discretion. As shown in FIG. 7, when the occupant 5 is thrown out far away from the motorcycle 1, an impact of the accident is large and automatic report is necessary, and when the occupant 5 is thrown out near the motorcycle 1, there is a high possibility that the impact of the accident is small and the automatic report is not necessary. For this reason, when the occupant 5 rises from the lying posture (see FIG. 6B), the accident level may be determined in consideration of a distance by which the occupant 5 is thrown from the motorcycle 1 when the accident occurs.

In this case, the distance by which the occupant 5 is thrown from the motorcycle 1 is estimated based on whether a radio wave of the FOB key 41 carried by the occupant 5 reaches the key receiver 36 of the motorcycle 1. The key receiver 36 is placed in a periphery of the main frame 12 as shown by a circle in FIG. 7. When the radio wave of the FOB key 41 reaches the key receiver 36, it is estimated that the occupant 5 is thrown out from the motorcycle 1 by a short distance, and when the radio wave of the FOB key 41 does not reach the key receiver 36, it is estimated that the occupant 5 is thrown out from the motorcycle 1 by a long distance. The impact of the accident or the injury to the occupant 5 can be estimated based on whether the occupant 5 is detected within a predetermined distance in which the radio wave of the FOB key 41 reaches the key receiver 36.

Since the thrown out occupant 5 falls to the ground, when the weight value W which is less than the first weight value $W_{t1}$ is detected by the weight sensor 40, the occupant 5 is detected within a predetermined distance from the motorcycle 1. The control unit 38 determines that the accident level is the low level when the weight value W increases from a value that is less than the first weight value $W_{t1}$ to a value that is equal to or more than the first weight value $W_{t1}$ and less than the second weight value $W_{t2}$ within the predetermined time while the occupant 5 is detected within the predetermined distance. Even if the impact of the accident is small while the occupant 5 cannot stand upright, the occupant 5 can handle the accident, such as reporting the accident, at own discretion, so that the accident is not automatically reported.

Parameters described above, such as the predetermined weight value $W_t$, the maximum bank angle $\theta_t$, the first weight value $W_{t1}$, the second weight value $W_{t2}$, and the predetermined time, are obtained experimentally, empirically or theoretically from past data or the like. For example, the predetermined weight value $W_t$, the first weight value $W_{t1}$, and the second weight value $W_{t2}$ may be set based on a total weight of the occupant 5. The predetermined weight value $W_t$ may be the same value as the first weight value $W_{t1}$ or the second weight value $W_{t2}$, or different values may be used.

Figure 8:
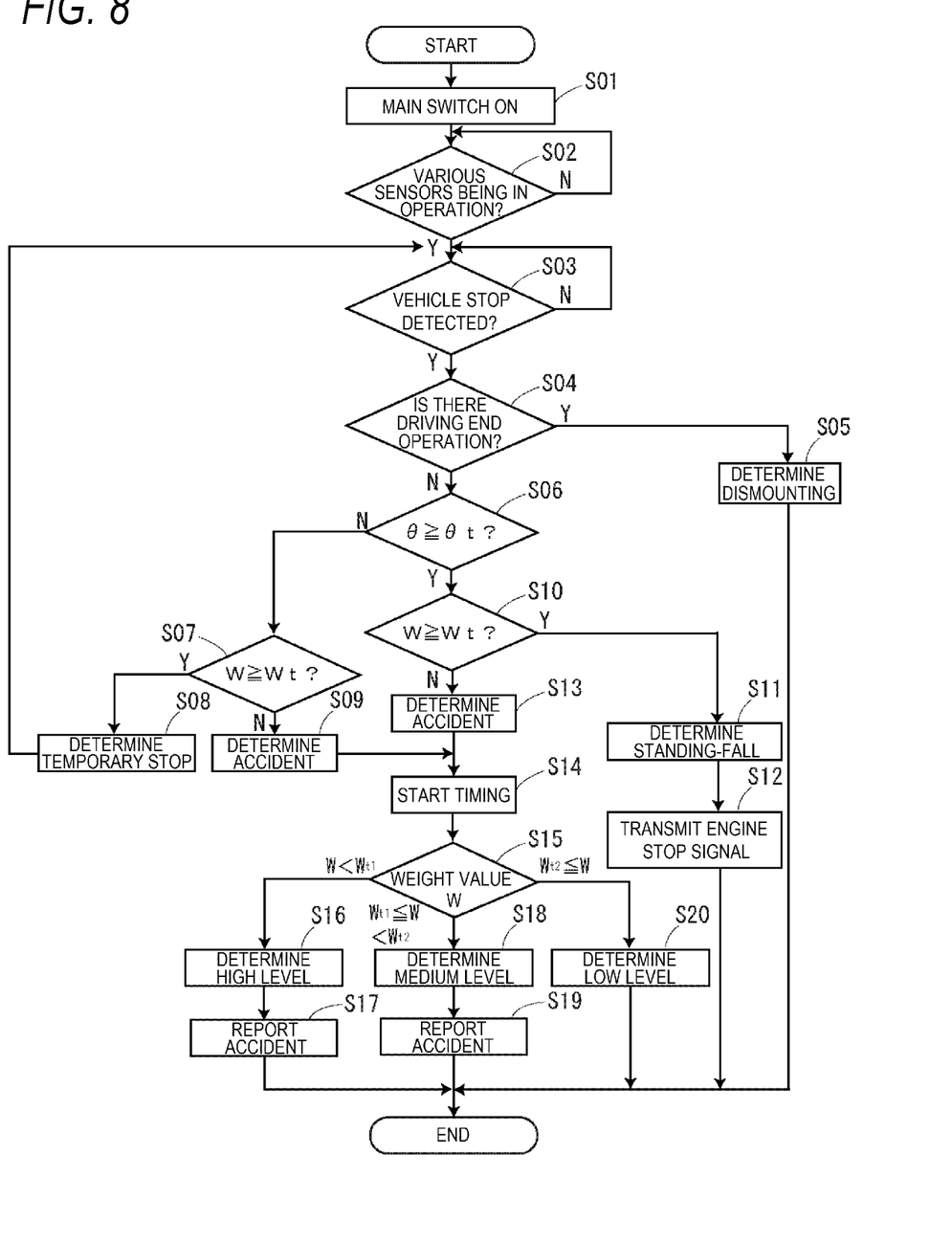
FIG. 8 is a flowchart of the accident determination processing according to the embodiment.

Next, a flow of the accident determination processing will be described with reference to FIG. 8. FIG. 8 is a flowchart of the accident determination processing according to the embodiment. Here, description will be made using reference numerals in FIGS. 2 and 3 as appropriate.

As shown in FIG. 8, when the main switch 30 is turned on (step S01), the control unit 38 determines whether the wheel speed sensor 32, the inclination sensor 35, the weight sensor 40, and the GPS receiver 33 are in operation (step S02). Operation states of the wheel speed sensor 32, the inclination sensor 35, the weight sensor 40, and the GPS receiver 33 are determined according to presence or absence of detection signals from the wheel speed sensor 32, the inclination sensor 35, the weight sensor 40, and received results from the GPS receiver 33. When the main switch 30 is ON, the operation states of the wheel speed sensor 32, the inclination sensor 35, the weight sensor 40, and the GPS receiver 33 are constantly monitored.

When the wheel speed sensor 32, the GPS receiver 33, the inclination sensor 35, and the weight sensor 40 are in operation (Yes in step S02), the control unit 38 determines whether a vehicle stop is detected (step S03). When the rotation speed of the wheel becomes zero, the vehicle stop is detected by the wheel speed sensor 32, and when GPS position information on the map does not change, the vehicle stop is detected by the GPS receiver 33. The vehicle stop may also be detected when no wheel speed signal is output from the wheel speed sensor 32. In this way, the vehicle stop is monitored based on output signals of the wheel speed sensor 32 and the GPS receiver 33.

When the vehicle stop is detected (Yes in step S03), the control unit 38 determines whether the occupant 5 has performed a driving end operation (step S04). When an OFF signal is output from the main switch 30 or an engine stop command signal is output from the engine stop switch 31, it is determined that the driving end operation has been performed by the occupant 5. When the driving end operation is performed by the occupant 5 (Yes in step S04), the control unit 38 determines that the vehicle is stopped due to dismounting (see FIG. 5A) (step S05).

When the occupant 5 does not perform the driving end operation (No in step S04), the control unit 38 determines whether the bank angle θ of the motorcycle 1 is equal to or larger than the maximum bank angle $\theta_t$ (step S06). Whether the motorcycle 1 is overturned is determined based on the bank angle θ detected by the inclination sensor 35. If the bank angle θ is less than the maximum bank angle $\theta_t$ (No in step S06), the vehicle is not overturned, and the control unit 38 determines whether the weight W of the occupant 5 is equal to or larger than the predetermined weight value $W_t$ (step S07). The posture of the occupant 5 is estimated based on the weight value W detected by the weight sensor 40.

When the weight value W is equal to or larger than the predetermined weight value $W_t$ (Yes in step S07), the control unit 38 determines that the vehicle is stopped due to a temporary stop (see FIG. 5(B)) since the vehicle is not overturned while the posture of the occupant 5 is the standing posture (step S08). On the other hand, when the weight value W is less than the predetermined weight value $W_t$ (No in step S07), the control unit 38 determines that the vehicle is stopped due to an accident (see FIG. 5(C)) since the vehicle is not overturned while the posture of the occupant 5 is the sitting posture or the lying posture (step S09). In this way, the accident can be determined in a case where the vehicle is not overturned.

In step S06, when the bank angle θ is equal to or larger than the maximum bank angle $\theta_t$ (Yes in step S06), the vehicle is overturned, and the control unit 38 determines whether the weight W of the occupant 5 is equal to or larger than the predetermined weight value $W_t$ (step S10). Similarly to step S07, the posture of the occupant 5 is estimated based on the weight value W detected by the weight sensor 40.

When the weight value W is equal to or larger than the predetermined weight value $W_t$ (Yes in step S10), the control unit 38 determines that the vehicle is stopped due to occurrence of standing-fall (see FIG. 5D) since the posture of the occupant 5 is the standing posture though the vehicle is overturned (step S11). When the standing-fall occurs, an engine stop signal is transmitted from the control unit 38, the engine is stopped and the vehicle is restored (step S12). On the other hand, when the weight value W is less than the predetermined weight value $W_t$ (No in step S10), the control unit 38 determines that the vehicle is stopped due to an accident (see FIG. 5E) since the vehicle is overturned while the posture of the occupant 5 is the sitting posture or the lying posture (step S13). In this way, it is possible to distinguish between a vehicle stop caused by occurrence of standing-fall and a vehicle stop caused by an accident.

When it is determined that the vehicle is stopped due to an accident (steps S09, S13), time that has elapsed since the occupant 5 falls down is measured by the timer in the control unit 38 (step S14). Since the weight of the occupant 5 hardly acts on the weight sensor 40 on the shoe sole 55 when the occupant 5 falls, the timer is started when the weight value W detected by the weight sensor 40 is less than the first weight value $W_{t1}$. The weight sensor 40 detects variation in the weight value W of the occupant 5 which is less than the first weight value $W_{t1}$ due to the falling (step S15).

When a state where the weight value W is less than the first weight value $W_{t1}$ is continued for a predetermined or longer time ($W<W_{t1}$ in step S15), the control unit 38 determines that the accident is a high level accident (see FIG. 6A) (step S16). In this way, when the occupant 5 cannot rise from the lying posture, it is estimated that the injury to the occupant 5 is serious and the occupant 5 cannot report at own discretion. When the high level accident is determined by the control unit 38, the accident is automatically reported by the accident report units 39, 43 (step S17).

When the weight value W increases from a value that is less than the first weight value $W_{t1}$ to a value that is equal to or more than the first weight value $W_{t1}$ and less than the second weight value $W_{t2}$ within the predetermined time ($W_{t1} \leq W < W_{t2}$ in step S15), the control unit 38 determines that the accident is a medium level accident (see FIG. 6B) (step S18). In this way, when the occupant 5 cannot stand up from the sitting posture after the occupant 5 rise from the lying posture, it is estimated that the injury to the occupant 5 is intermediate and the occupant 5 cannot report at own discretion. When the medium level accident is determined by the control unit 38, the accident is automatically reported by the accident report units 39, 43 (step S19).

When the weight value W increases from a value that is less than the first weight value $W_{t1}$ to a value that is equal to or more than the second weight value $W_{t2}$ within the predetermined time ($W_{t2}$ W in step S15), the control unit 38 determines that the accident is a low level accident (see FIG. 6C) (step S20). In this way, when the occupant 5 can stand up from the lying posture, the accident is not reported by the accident report units 39, 43 since the injury to the occupant 5 is light and the occupant 5 can handle the accident at own discretion.

In step S18, the accident level may be determined in consideration of the distance by which the occupant 5 is thrown from the motorcycle 1 when the accident occurs. Whether the occupant 5 is within a predetermined distance from the motorcycle 1 is determined based on whether a radio wave from the FOB key 41 carried by the occupant 5 can be received by the key receiver 36 of the motorcycle 1. Detection of the occupant 5 is performed when the occupant 5 is thrown out from the motorcycle 1 and the weight value W detected by the weight sensor 40 is less than the first weight value $W_{t1}$.

In this case, whether the occupant 5 is within the predetermined distance from the motorcycle 1 is determined when the weight value W increases from a value that is less than the first weight value $W_{t1}$ to a value that is equal to or more than the first weight value $W_{t1}$ and less than the second weight value $W_{t2}$ within the predetermined time ($W_{t1} \leq W < W_{t2}$). When the occupant 5 is not within the predetermined distance from the motorcycle 1, the control unit 38 determines that the accident is a medium level accident, and when the occupant 5 is within the predetermined distance from the motorcycle 1, the control unit 38 determines that the accident is a low level accident. The reason for this configuration is that, even if the occupant 5 is thrown out from the motorcycle 1, if a thrown distance is short (for example, within a range of about 2 [m] as shown in FIG. 7), it is estimated that an impact received from the ground is small. For this reason, as shown in FIG. 7, the occupant 5 is possible to handle the accident at own discretion thereafter.

As described above, according to the present embodiment, whether the vehicle stop is caused by dismounting of the occupant 5 or the vehicle stop is caused by reasons other than dismounting is determined based on the detection result of the vehicle stop provided by the wheel speed sensor 32 and the GPS receiver 33 and the operation result of the end operation of the main switch 30 and the engine stop switch 31. Whether the vehicle stop is caused by the occurrence of the standing-fall or the temporary stop or the vehicle stop is caused by the accident is identified based on the weight value W of the occupant 5 detected by the weight sensor 40. Therefore, the accident can be appropriately determined.

Although the accident determination system in the present embodiment identifies the vehicle stop caused by standing-fall and the vehicle stop caused by accident to determine the accident, and further determines the accident level when the accident is determined, the present invention is not limited to this configuration. The accident determination system may be only configured to identify the vehicle stop caused by standing-fall and the vehicle stop caused by accident to determine the accident without determining the accident level.

Although the control unit in the present embodiment is configured to determine the overturn of the vehicle, the present invention is not limited to this configuration. The control unit may determine the accident without determining the overturn of the vehicle.

Although the control unit in the present embodiment is configured to determine the accident level into three levels, the present invention is not limited to this configuration. The control unit may determine the accident level into two or more levels.

Although the wheel speed sensor and the GPS receiver are used as the stop detection unit in the present embodiment, the present invention is not limited to this configuration. The stop detection unit is not particularly limited as long as the vehicle stop of the straddle-type vehicle can be detected.

Although the main switch and the engine stop switch are used as the end operation unit in the present embodiment, the present invention is not limited to this configuration. The end operation unit is not particularly limited as long as the driving end operation performed by the occupant can be received.

Although the pressure sensor provided on the shoe sole of the occupant is used as the weight detection unit in the present embodiment, the present invention is not limited to this configuration. The weight sensor is not particularly limited as long as the weight value can be detected according to the posture of the occupant.

Although the FOB key of the smart entry system is used as the occupant detection unit in the present embodiment, the present invention is not limited to this configuration. The occupant detection unit is not particularly limited as long as the occupant can be detected within the predetermined distance from the straddle-type vehicle.

Although the inclination sensor, which detects the bank angle of the motorcycle with a vertical plane being set as 0 degree, is used as the inclination angle detection unit in the present embodiment, the present invention is not limited to this configuration. The inclination angle detection unit may have any configuration as long as the inclination angle of the straddle-type vehicle can be detected, for example, a horizontal plane may be set as 0 degree to detect the inclination angle of the straddle-type vehicle.

Although the weight sensor in the present embodiment is provided on the shoe sole of the occupant, the present invention is not limited to this configuration. The weight sensor may be provided at any position where the weight value of the occupant can be detected, and may be provided in a buttock portion of clothes of the occupant, for example. In this case, the control unit determines that an accident has occurred when the weight value is equal to or larger than a predetermined weight value.

Although the accident determination system in the present embodiment automatically reports the accident when the accident level is the medium level or the high level, the present invention is not limited to this configuration. The accident determination system may only determine the accident without reporting the accident.

Although the pair of accident report units is provided on the motorcycle and the wearing article of the occupant in the present embodiment, the present invention is not limited to this configuration. The accident report unit may be provided on one of the motorcycle or the wearing article of the occupant.

The program of the accident determination processing according to the present embodiment may be stored in a storage medium. The storage medium is not particularly limited, and may be a non-transitory storage medium such as an optical disk, a magneto-optical disk, or a flash memory.

As described above, the accident determination system (20) according to the present embodiment is an accident determination system that determines an occurrence of an accident in a straddle-type vehicle (the motorcycle 1), which includes: a stop detection unit (the wheel speed sensor 32 and the GPS receiver 33), which detects a vehicle stop of the straddle-type vehicle; an end operation unit (the main switch 30 and the engine stop switch 31), which receives a driving end operation performed by an occupant (5); a weight detection unit (the weight sensor 40), which detects a weight value (W) according to a posture of the occupant; and a control unit (38), which determines whether the vehicle stop is caused by dismounting based on a detection result of the stop detection unit and an operation result of the end operation unit, and determines an occurrence of an accident based on a detection result of the weight detection unit during a vehicle stop caused by a reason other than dismounting. According to this configuration, whether the vehicle stop is caused by dismounting of the occupant or the vehicle stop is caused by reasons other than dismounting is determined based on a detection result of the vehicle stop provided by the stop detection unit and an operation result of the end operation provided by the end operation unit. Whether the vehicle stop is caused by the occurrence of the standing-fall or the temporary stop or the vehicle stop is caused by the accident is identified based on the weight value of the occupant detected by the weight detection unit. Therefore, the accident can be appropriately determined.

In the accident determination system according to this embodiment, the control unit determines that an accident occurs when the weight value is less than a predetermined weight value ($W_t$). According to this configuration, it is possible to estimate that the occupant cannot stand up from the lying posture and the sitting posture, and it can be determined that an accident occurs.

The accident determination system according to the present embodiment further includes an inclination angle detection unit (the inclination sensor 35) which detects an inclination angle (the bank angle θ) of the straddle-type vehicle, and the control unit determines a vehicle overturn based on a detection result of the inclination angle detection unit. According to this configuration, the vehicle overturn is determined based on the inclination angle. Therefore, it is possible to more appropriately distinguish between a vehicle stop caused by accident and a vehicle stop caused by reasons other than accident.

In the accident determination system according to this embodiment, the control unit determines that an accident occurs when the inclination angle is less than a predetermined angle (the maximum bank angle $θ_t$) while the weight value is less than the predetermined weight value. According to this configuration, it is possible to determine an accident in a state where the straddle-type vehicle is supported by a guardrail or the like, and the vehicle is prevented from being overturned.

In the accident determination system according to the present embodiment, the control unit determines an accident level when the accident is determined. According to this configuration, severity of injury to the occupant can be estimated according to the accident level.

In the accident determination system according to the present embodiment, the control unit stores a first weight value ($W_{t1}$) for distinguishing between a lying posture and a sitting posture, and a second weight value ($W_{t2}$) for distinguishing between the sitting posture and a standing posture. The second weight value ($W_{t2}$) is larger than the first weight value ($W_{t1}$). A weight value which is less than the first weight value ($W_{t1}$) indicates the lying posture. A weight value which is equal to or larger than the first weight value ($W_{t1}$) and less than the first weight value ($W_{t2}$) indicates the sitting posture. A weight value which is equal to or larger than the first weight value ($W_{t2}$) indicates the standing posture. The control unit determines that the accident level is a high level when the weight value continues for a predetermined time or longer in a state where the weight value is less than the first weight value ($W_{t1}$), the control unit determines that the accident level is a medium level when the weight value is less than the first weight value ($W_{t1}$) and then becomes a value equal to or larger than the first weight value ($W_{t1}$) and less than the first weight value ($W_{t2}$) within the predetermined time, and the control unit determines that the accident level is a low level when the weight value is less than the first weight value ($W_{t1}$) and then becomes a value equal to or larger than the first weight value ($W_{t2}$) within the predetermined time. According to this configuration, when the weight value which is less than the first weight value ($W_{t1}$) is continued for a predetermined or longer time, it is determined that a high level accident has occurred such that the occupant cannot rise from the lying posture. When the weight value increases from a value that is less than the first weight value ($W_{t1}$) to a value that is equal to or larger than the first weight value ($W_{t1}$) and less than the first weight value ($W_{t2}$) within the predetermined time, it is determined that a medium level accident has occurred such that the occupant can rise from the lying posture to the sitting posture but cannot stand up from the sitting posture. When the weight value increases from a value that is less than the first weight value ($W_{t1}$) to a value that is equal to or larger than the first weight value ($W_{t2}$) within the predetermined time, it is determined that a low level accident has occurred such that the occupant can stand up from the lying posture. In this way, the accident level can be determined according to the severity of the injury to the occupant.

The accident determination system according to the present embodiment further includes an occupant detection unit which detects the occupant within a predetermined distance from the straddle-type vehicle. The accident level is determined to be the low level when the occupant is detected within the predetermined distance when the weight value is less than the first weight value ($W_{t1}$), and then the weight value, which is less than the first weight value ($W_{t1}$), becomes a value which is equal to or larger than the first weight value ($W_{t1}$) and less than the first weight value ($W_{t2}$) within the predetermined time. According to this configuration, if the occupant is within the predetermined distance from the straddle-type vehicle, it is estimated that the occupant is not thrown far when the accident occurs. Therefore, although the occupant cannot stand up from the sitting posture, it can be determined that the low level accident has occurred such that the occupant can handle the accident, such as reporting the accident, at own discretion.

The accident determination system according to the present embodiment further includes accident report units (39, 43) which automatically report the accident when the accident level is the medium level or the high level. According to this configuration, when the high level accident and the medium level accident have occurred such that the occupant cannot report the accident at own discretion, the accident can be automatically reported to acquire rescue.

In the accident determination system according to the present embodiment, the accident report unit is a pair of accident report units, and one accident report unit is provided in a wearing article (the helmet 52, the clothing 51, the shoes 54, the gloves 53 or the waist bag) or a portable communication terminal (the smartphone) of the occupant, while another accident report unit is provided in the straddle-type vehicle. According to this configuration, even if one of the pair of accident report units is damaged due to the accident, the accident can be reported from the other accident report unit.

In the accident determination system according to the present embodiment, the weight detection unit is provided on a shoe sole (55) of the occupant. According to this configuration, the weight value can be detected according to the posture of the occupant by the weight detection unit provided on the shoe sole.

In the accident determination system according to the present embodiment, the control unit is provided in a periphery of a main frame of the straddle-type vehicle. According to this configuration, since the control unit is provided in the periphery of the main frame where impact resistance is secured, the control unit can be protected from an impact of the accident.

In the accident determination system according to the present embodiment, the control unit is provided in a wearing article or a portable communication terminal of the occupant. According to this configuration, since the control unit is provided in the wearing article or the portable communication terminal of the occupant, the control unit can be shared between a plurality of straddle-type vehicles.

The accident determination method according to the present embodiment is an accident determination method that determines an occurrence of an accident in a straddle-type vehicle, which includes: detecting a vehicle stop of the straddle-type vehicle; determining whether an occupant performs a driving end operation; determining whether the vehicle stop is caused by dismounting based on a detection result of the vehicle stop and an operation result of the driving end operation; and determining an occurrence of an accident based on a weight value according to a posture of the occupant during a vehicle stop caused by a reason other than dismounting. According to this configuration, whether the vehicle stop is caused by dismounting of the occupant or the vehicle stop is caused by reasons other than dismounting is determined based on a detection result of the vehicle stop and an operation result of the driving end operation. Whether the vehicle stop is caused by the occurrence of the standing-fall or the temporary stop or the vehicle stop is caused by the accident is identified based on the weight value of the occupant. Therefore, the accident can be appropriately determined.

The program according to the present embodiment is a program of an accident determination system that determines an occurrence of an accident in a straddle-type vehicle. The program causes the accident determination system to execute the following: detecting a vehicle stop of the straddle-type vehicle; determining whether an occupant performs a driving end operation; determining whether the vehicle stop is caused by dismounting based on a detection result of the vehicle stop and an operation result of the driving end operation; and determining an occurrence of an accident based on a weight value according to a posture of the occupant during a vehicle stop caused by a reason other than dismounting. According to this configuration, a motorcycle or a portable communication terminal can be used as the accident determination system by installing the program in the motorcycle or the portable communication terminal. Therefore, the program which determines the accident can be easily introduced to the motorcycle or the portable communication terminal owned by a user.

Although in the present embodiment the engine as has been described as the power source of the motorcycle, an electric motor may be used as the power source in another embodiment. The above embodiment and modification may be combined in whole or in part.

The technique of the present invention is not limited to the above embodiment, and various changes, substitutions, and alterations may be made without departing from the spirit of the technical idea. Further, the present invention may be implemented by using other methods as long as the technical idea of the present invention can be realized by the methods through progress of the technique or other derivative technology. Accordingly, the claims cover all embodiments that may be included within the scope of the technical ideas.

According to the accident determination system according to the aspect of the present invention, whether the vehicle stop is caused by dismounting or the vehicle stop is caused by reasons other than dismounting is determined based on the detection result of the vehicle stop and the operation result of the driving end operation. Further, whether the vehicle stop is caused by standing-fall, temporary stop and the like or the vehicle stop is caused by an accident is identified based on the weight value of the occupant during the vehicle stop caused by reasons other than dismounting, thus the accident is appropriately determined.

What is claimed is:

1. An accident determination system that determines an occurrence of an accident in a straddle-type vehicle, comprising:
    a stop detector configured to detect a vehicle stop of the straddle-type vehicle;
    an end operation part configured to receive a driving end operation performed by an occupant;
    a weight detector configured to detect a weight value according to a posture of the occupant; and
    a controller configured to determine whether the vehicle stop is caused by dismounting based on a detection result of the stop detector and an operation result of the end operation part, and determine an occurrence of an accident based on a detection result of the weight detector during the vehicle stop caused by a reason other than dismounting.

2. The accident determination system according to claim 1, wherein the controller determines that the accident occurs, when the weight value is less than a predetermined weight value.

3. The accident determination system according to claim 1, further comprising:
    an inclination angle detector, which detects an inclination angle of the straddle-type vehicle, wherein
    the controller determines a vehicle overturn based on a detection result of the inclination angle detector.

4. The accident determination system according to claim 3, wherein the controller determines that the accident occurs, when the inclination angle is less than a predetermined angle and the weight value is less than the predetermined weight value.

5. The accident determination system according to claim 1, wherein the controller determines an accident level when the occurrence of the accident is determined.

6. The accident determination system according to claim 5, wherein
    the controller stores a first weight value for distinguishing between a lying posture and a sitting posture and a second weight value for distinguishing between the sitting posture and a standing posture, the second weight value is larger than the first weight value,
    a weight value which is less than the first weight value indicates the lying posture, a weight value which is equal to or larger than the first weight value and less than the second weight value indicates the sitting posture, and a weight value which is equal to or larger than the second weight value indicates the standing posture, and
    the controller determines that the accident level is a high level when the weight value continues for a predetermined time or longer in a state where the weight value is less than the first weight value, the controller determines that the accident level is a medium level when the weight value is less than the first weight value and then becomes a value equal to or larger than the first weight value and less than the second weight value within the predetermined time, and the controller determines that the accident level is a low level when the weight value is less than the first weight value and then becomes a value equal to or larger than the second weight value within the predetermined time.

7. The accident determination system according to claim 6, further comprising:
    an occupant detector configured to detect the occupant within a predetermined distance from the straddle-type vehicle, wherein
    the controller determines that the accident level is the low level when the occupant is detected within the predetermined distance when the weight value is less than the first weight value, and then the weight value, which is less than the first weight value, becomes a value which is equal to or larger than the first weight value and less than the second weight value within the predetermined time.

8. The accident determination system according to claim 6, further comprising:
    an accident report part configured to automatically reports the accident when the accident level is the medium level or the high level.

9. The accident determination system according to claim 8, wherein
    the accident report part is a pair of accident report parts, and one of the accident report parts is provided in a wearing article or a portable communication terminal of the occupant, and the other one of the accident report parts is provided in the straddle-type vehicle.

10. The accident determination system according to claim 1, wherein the weight detector is provided on a shoe sole of the occupant.

11. The accident determination system according to claim 1, wherein the controller is provided in a periphery of a main frame of the straddle-type vehicle.

12. The accident determination system according to claim 1, wherein the controller provided in a wearing article or a portable communication terminal of the occupant.

13. An accident determination method that determines an occurrence of an accident in a straddle-type vehicle, comprising:
    detecting a vehicle stop of the straddle-type vehicle;
    determining whether an occupant performs a driving end operation;
    determining whether the vehicle stop is caused by dismounting based on a detection result of the vehicle stop and an operation result of the driving end operation; and
    determining an occurrence of an accident based on a weight value according to a posture of the occupant during the vehicle stop caused by a reason other than dismounting.

* * * * *